United States Patent [19]

Gillies et al.

[11] Patent Number: 5,138,448
[45] Date of Patent: Aug. 11, 1992

[54] DEVICE FOR CONVERSION OF FRAME FREQUENCY AND NUMBER OF LINES FOR A HIGH-DEFINITION TELEVISION RECEIVER

[75] Inventors: David Gillies, Strasbourg; Jean-Yves Moraillon, Molsheim, both of France

[73] Assignee: Laboratoire Europeen de Researches Electronique Avancees, Courbevoie, France

[21] Appl. No.: 569,996

[22] Filed: Aug. 20, 1990

[30] Foreign Application Priority Data

Aug. 22, 1989 [FR] France ................. 89 11102

[51] Int. Cl.$^5$ ............................................ H04N 7/01
[52] U.S. Cl. ........................... 358/140; 358/160
[58] Field of Search .................. 358/140, 12, 160

[56] References Cited

U.S. PATENT DOCUMENTS

| 4,739,405 | 4/1988 | Sumida .................. 358/140 X |
| 4,956,707 | 9/1990 | Oakley et al .......... 358/140 |
| 4,956,708 | 9/1990 | Itagaki .................. 358/140 |
| 4,979,041 | 12/1990 | Schreiber ............. 358/140 X |

FOREIGN PATENT DOCUMENTS 0241284 10/1987 European Pat. Off.
0322956 7/1989 European Pat. Off.

OTHER PUBLICATIONS

IEEE 1989 Int'l Conference ... Jun. 1989, D Gillies.

*Primary Examiner*—Victor R. Kostak
*Attorney, Agent, or Firm*—Roland Plottel

[57] ABSTRACT

A device for conversion of frame frequency and number of lines for a high-definition television receiver which receives input video signals corresponding to different standards and to output a high-definition signal at a desired frame frequency and with the desired number of lines. The device uses a pass-band reduction decoder processing the high-definition input 625/2:1/50 Hz video signals. It includes: a memory, a decoder, and a processing circuit. The memory stores the input video signal frames at a frequency which is a function of the frame frequency of the input signal. This memory is read at the frame frequency desired at the output. The decoder is a pass-band reduction decoder connected to the memory and gives separately at its outputs even and odd frames, respectively, of a decompressed high-definition video signal output at the frame frequency desired. The video processing circuit is connected to the outputs of the pass-band reduction decoder and delivers a display video signal at the required frame frequency and number of lines.

8 Claims, 3 Drawing Sheets

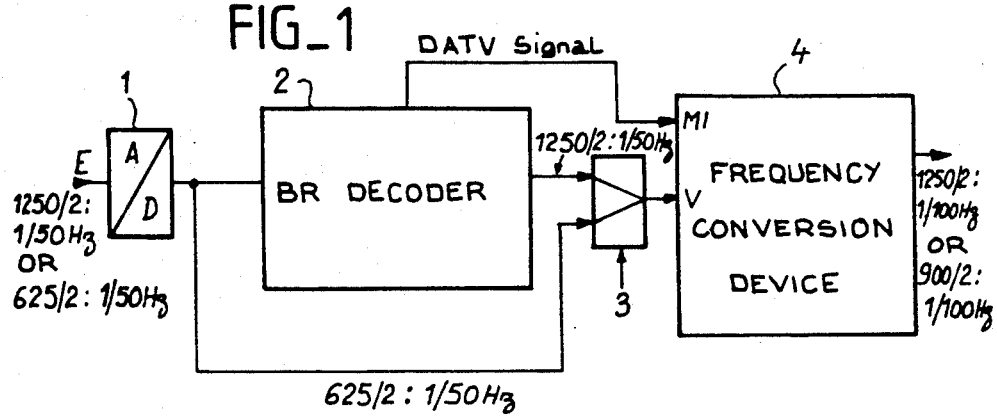
FIG_1
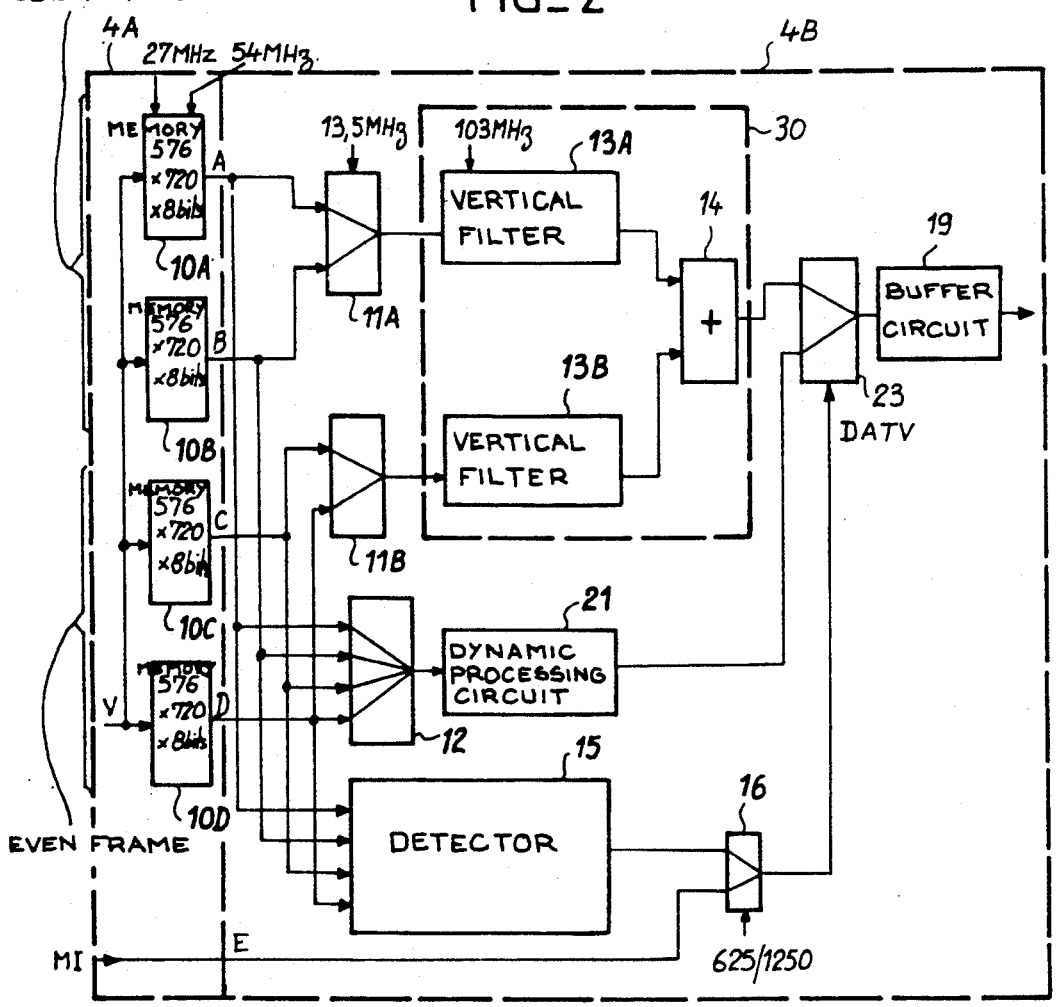
FIG_2

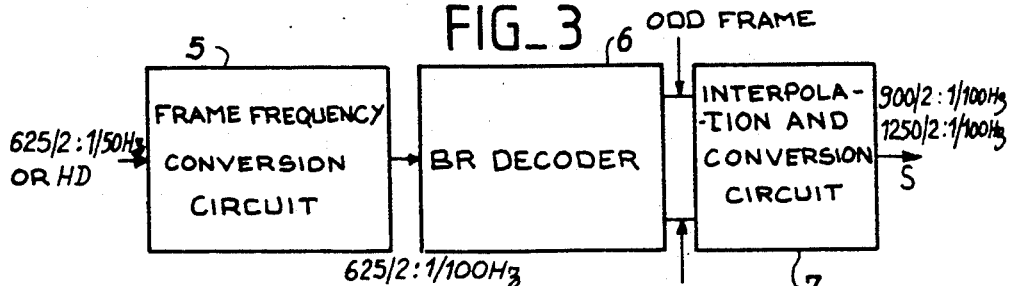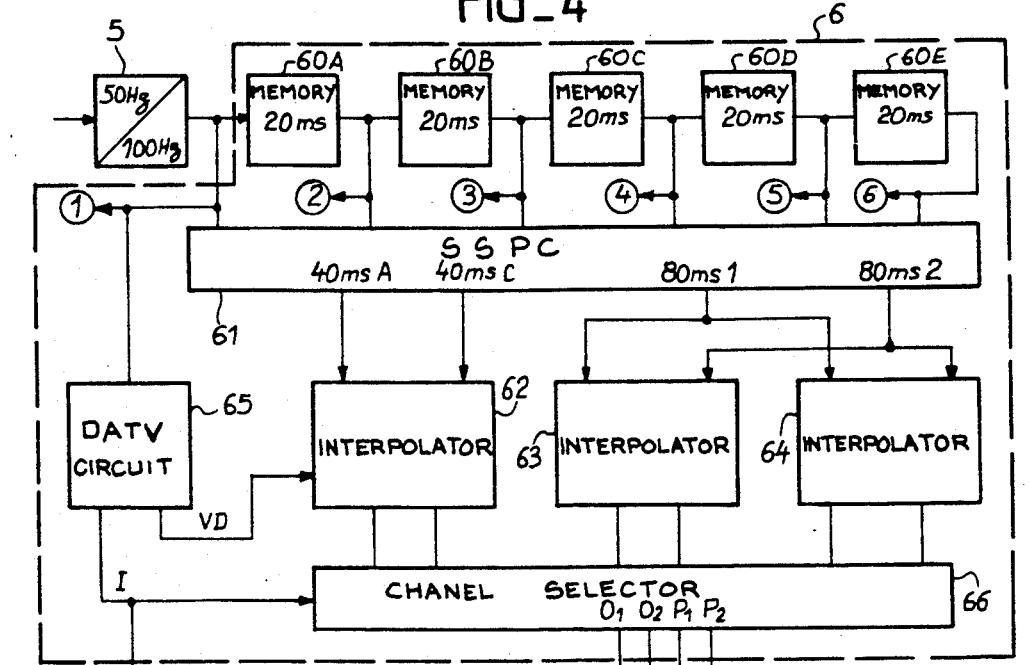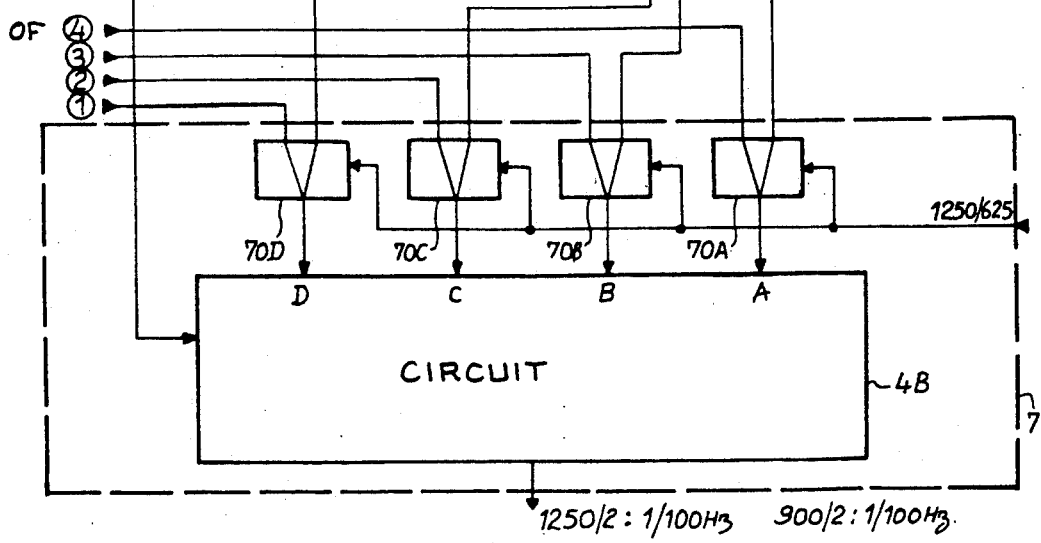

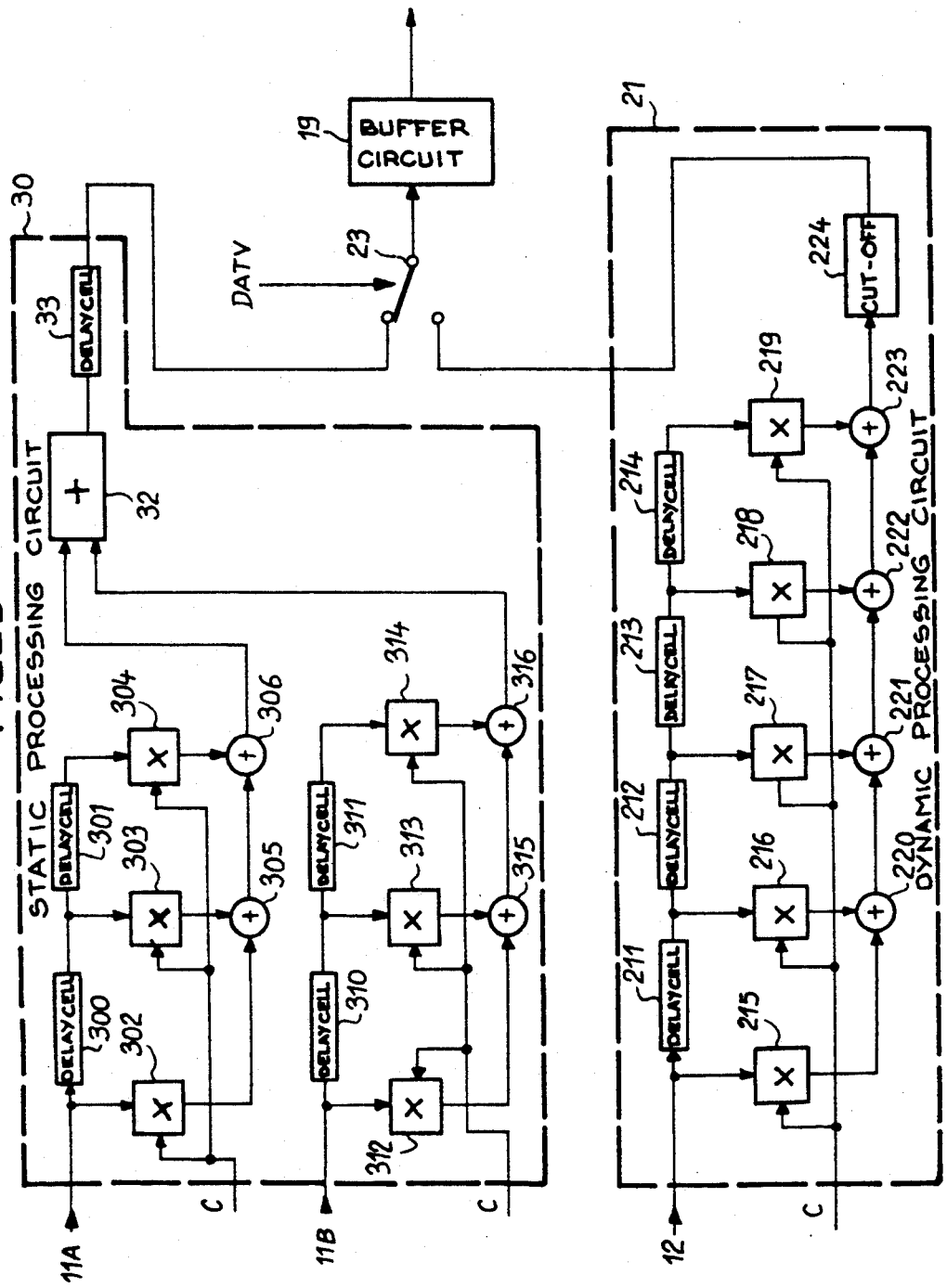

DEVICE FOR CONVERSION OF FRAME FREQUENCY AND NUMBER OF LINES FOR A HIGH-DEFINITION TELEVISION RECEIVER

BACKGROUND OF THE INVENTION

1. Field of the invention

The present invention concerns a device for conversion of frame frequency and number of lines for a high-definition television receiver, more particularly a device for conversion of frame frequency and number of lines for a high-definition television receiver able to receive high-definition input signals emanating more particularly from a high-definition 625 lines, interlaced, 50 Hz (625/2:1/50 Hz) source. The device of the present invention also applies to standard-definition signals such as 625/2:1/50 Hz, PAL, SECAM and MAC signals.

2. Description of the prior art

A frame frequency conversion device for high-definition television receivers has already been proposed in the French patent application no. 89 03861, dated 23rd Mar. 1989, in the name of the Applicant. As shown in FIG. 1, this device comprises essentially an analog-digital converter 1 which receives an input of video signals E such as high-definition 1250/2:1/50 Hz signals in the baseband or compressed in accordance with the HD-MAC procedure in the 625/2:1/50 Hz standard, hereinafter called 625/2:1/50 Hz high-definition signals, or PAL, SECAM or MAC 625/2:1/50 Hz standard signals. The 625/2:1/50 Hz standard signals output from the converter 1 are sent directly to a switching device 3 while the high-definition signals are sent to the device 3 via an ordinary pass-band reduction decoder 2. The switching device 3 sends either 1250/2:1/50 Hz signals or 625/2:1/50 Hz signals to a frequency conversion device 4 as represented in FIG. 2 and described in French patent application no. 89 03861 in the name of the Applicant. This frequency conversion device 4 receives DATV (Digital Assisted Television) information. This DATV signal from the decoder 2 includes movement information MI. The frequency conversion device 4 gives an output signal S used for display on the screen. This output signal S is a 1250/2:1/100 Hz or 900/2:1/100 Hz high-definition signal. In the device shown in FIG. 1, the frame frequency conversion is performed in the circuit 4. To do so, and as represented in FIG. 2, the circuit 4 includes in input an image memory to store two frames, i.e. the even and odd frames, in accordance with the input standard, which is a frame frequency of 50 Hz (frame duration 20 ms). This memory enables this duration to be compressed to half its length, to obtain an output frame frequency of 100 Hz, giving a frame duration of 10 ms. In fact, as represented in FIG. 2, this image memory is made up of four memories 10A, 10B, 10C, 10D enabling storage of the even points of the even frames, the odd points of the even frames, the even points of the odd frames and the odd points of the odd frames. Each memory has a capacity of 1250 lines × 720 points × 8 bits to be able to store an image of 1250 lines × 1440 points, corresponding to a decompressed high-definition image. The use of four memories 10A, 10B, 10C, 10D is intended to restrict the read frequency of the memories to 54 MHz. As described in more detail below, multiplexers 11A, 11B or 12 will make it possible to reconstitute the sample stream at 108 MHz.

In addition, as represented in FIG. 2, the circuit 4 includes a part 4B which will be described in more detail later and which enables filtering, decimation and vertical interpolation operations to be performed. These operations are carried out at the frame frequency required, i.e. 100 Hz in the mode of embodiment represented. The circuit 4 is thus constituted of two distinct parts, a memory 4A enabling frame frequency conversion and a part 4B. However, as described above, part 4A requires a large amount of memory space.

SUMMARY OF THE INVENTION

The aim of the present invention is to propose a new device for the conversion of frame frequency and number of lines for a high-definition television receiver, enabling the frequency conversion to be performed using less memory space for 625/2:1/50 Hz high-definition or 625/2:1/50 Hz standard signals.

So the object of the present invention is a device for conversion of frame frequency and number of lines for a high-definition television receiver able to receive video signals of different standards in input and to give in output a high-definition type signal at the desired frame frequency and number of lines, the said device being associated with a pass-band reduction decoder which processes the input high-definition 625/2:1/50 Hz video signals, comprising:

at least a first memory to store the input video signal frames at a frequency depending on the frame frequency of the input signal, this memory being read at the frame frequency required in output;

a pass-band reduction decoder connected to the memory and delivering the even and odd frames of the decompressed high-definition video signal separately at the output at the frame frequency required at output, and a video processing circuit connected to each of the outputs of the pass-band reduction decoder, able to give a display video signal at the frame frequency and number of lines required.

According to a preferred mode of embodiment, the video processing circuit is constituted of:

a static signal processing circuit connected to each of the outputs of the pass-band reduction decoder giving the even and odd numbers and delivering a signal at the desired frame frequency and number of lines;

a dynamic signal processing circuit connected alternately to each output of the pass-band reduction decoder giving the even and odd frames via a first switching circuit and delivering a signal at the desired frame frequency and number of lines, and a second switching circuit connected respectively to the static type signal processing circuit and the dynamic type signal processing circuit, the switching of the device being controlled by a movement detection signal.

In the same way, according to a preferred embodiment, the pass-band reduction decoder includes at least m frame memories (m ≧ 3) connected in series at output from the first memory, a decoding circuit and four outputs generating respectively the even and odd frames for the even and odd points.

In addition, in order to be able to use the device of the present invention both with high-definition input video signals and with standard signals such as PAL or SECAM signals, this device also includes four switching circuits each receiving at one input an output from the pass-band reduction decoder, and at the other input, either the memory input or the output of the first three memories, the circuits switching to one or the other input depending on a signal indicating the type of video signals input.

BRIEF DESCRIPTION OF THE DRAWINGS

Other characteristics and advantages of the present invention will appear on reading the description below of a preferred mode of embodiment with reference to the appended drawings, in which:

FIG. 1, described above, is a simplified block diagram of a high-definition television receiver including a device for frame frequency conversion such as that described in the French patent application no. 89 03861;

FIG. 2, described above, is a block diagram of a mode of embodiment of the device for frame frequency conversion in French patent application no. 89 03861;

FIG. 3 is a simplified block diagram of a device for conversion of the frame frequency and number of lines in accordance with the present invention;

FIG. 4 is a more detailed block diagram of the device represented in FIG. 3, and FIG. 5 is a block diagram of the filtering, decimation, interpolation and line number conversion part used in the device of the present invention.

To simplify the description, the same parts have the same reference numbers in all the figures.

DESCRIPTION OF THE PREFERRED EMBODIMENT

As represented in FIG. 3, the device for conversion of the frame frequency and number of lines in accordance with the present invention includes a frame frequency conversion circuit 5 which receives as input a high-definition 625/2:1/50 Hz video signal or a standard 625/2:1/50 Hz video signal. The input video signal is in fact a compressed video signal which has been coded to be compatible with the transmission channel such as the D2-MAC or D-MAC transmission channels, as will be explained below. The conversion circuit 5 is constituted of a memory with a capacity of 288 lines×720 points×8 bits, in order to store the successive frames of the coded video signal. The data in this memory are written at a frequency selected as a function of the input frame frequency, i.e. a frequency of 50 Hz in the mode of embodiment represented. To perform the frequency conversion, this memory is read at a frequency selected as a function of the output frequency desired, i.e. 100 Hz in the mode of embodiment represented. The conversion circuit 5 is connected to a pass-band reduction decoder 6. This pass-band reduction decoder 6 will be described in more detail with reference to FIG. 4. It corresponds approximately to the pass-band reduction decoder developed by the Philips company within the framework of the EUREKA project, described in IEEE Conference paper 293 in 1988. The decoder 6 has the same main circuits as a normal decoder. However, these circuits will be interconnected in such a way as to obtain the odd frames at an output O and the even frames at an output P. In addition, the decoder 6 receiving input signals of type 625/2:1/100 Hz must operate at a frequency double that of the conventional decoder. As shown in FIG. 3, the decoder 6 is connected to a circuit 7 whose main role is to perform the interpolation and conversion of the number of lines in such a way as to obtain an output signal S of type 1250/2:1/100 Hz or 900/2:1/100 Hz.

We shall now describe, with reference particularly to FIGS. 2, 4 and 5, the various circuits constituting the decoder 6 and the circuit 7. The decoder 6 represented in FIG. 4 is in fact a decoder used to decompress a high-definition 625/2:1/50 Hz video signal which has been compressed to make it transmissible by a MAC-type channel. To make this transmission possible, a video signal with 625 lines per frame (every 20 ms) and 1728 points per line has to be compressed into a signal with 312.5 lines per frame and 864 points per line. This implies a compression ratio of 1:4. In this case, the principle used consists in adapting the compression mode to the temporal resolution of the image to be transmitted. Depending on the standard selected, three compression modes are possible, known as 80 ms, 20 ms and 40 ms, each mode preserving the spatial or temporal resolution of the image, or making a compromise of the two. A more detailed description of the three compression modes is given in the paper mentioned above. Thus, the pass-band reduction decoder 6 must be able to decompress a video signal as described above.

Various algorithms can be used for this decoding. However, the most efficient algorithms use information transmitted on six successive frames. They therefore require the use of five frame memories. As a result, the decoder 6 represented in FIG. 4 includes five frame memories $60_A$, $60_B$, $60_C$, $60_D$, $60_E$. Each memory has a capacity of 288 lines×720 points×8 bits. These memories are connected in series. The input of the memory $60_A$ and the outputs of the five memories $60_A$, $60_B$, $60_C$, $60_D$, $60_E$ are connected in parallel on a circuit 61 known as an SSPC (sub-sampling pattern converter). The role of this circuit is to provide, at outputs 40 msA, 40 msC and 80 ms1, 80 ms2, samples corresponding to the sampling patterns used in the 40 or 80 ms modes, whatever mode is used for transmission. This circuit 61 is connected to the interpolators 62, 63, 64 which perform the processing of the 40 ms channel, the 20 ms channel and the 80 ms channel respectively. More specifically, the interpolator 62 is connected to the 40 msA and 40 msC outputs of the circuit 61, while the interpolators 63 and 64 receive in parallel the 80 ms1 and 80 ms2 outputs respectively of the circuit 61. In addition, the decoder 6 includes a digital assistance decoding circuit 65. This circuit processes the signals—known as "digital assistance signals"—containing information on the type of processing to be performed, such as movement vectors or information on the transmission mode. The movement vectors VD from the decoder 65 are transmitted to the interpolator 62. The decoder 6 also possesses a channel selector 66 which receives as input the outputs (in parallel) of the interpolators 62, 63 and 64. More specifically, the channel selector receives in parallel for each interpolator the even frames and the odd frames. This differs from known types of channel selector, which are preceded by a multiplexer giving interlaced frames. The selector 66 is controlled by channel selection information I from the decoder 65. The channel selector 66 has four outputs O1, O2, P1, P2, making it possible to obtain in parallel the odd frames of the odd points O1, the odd frames of the even points O2, the even frames of the odd points P1 and the even frames of the even points P2. As represented in FIG. 4, the four outputs of the selector 66 are connected in parallel on the circuit 7.

So that the device of the present invention can handle both high-definition 625/2:1/50 Hz input and standard definition PAL, SECAM or MAC signals, the input to circuit 7 has four two-channel multiplexers $70_A$, $70_B$, $70_C$, $70_D$ which each receive at one input one of the outputs of the selector 66 and at the other input either the input marked 1 of the memory 60$_A$, or the outputs marked 2, 3 and 4 of the memories 60$_A$, 60$_B$ and 60$_C$ respectively of the decoder 6. In this case, the memories of the pass-band reduction decoder are used as the frame memory necessary to perform the conversion to the number of lines required and the movement detection for a standard-type video signal. The multiplexers 70$_A$, 70$_B$, 70$_C$, 70$_D$ are switched to one or the other input depending on a signal indicating whether there is a 625 line signal or a high-definition 1250 line signal from the selector 66. The circuit 7 also has a circuit 4B which performs filtering and transformation to the desired number of lines. This circuit 4B is identical to the circuit 4B of the device represented in FIG. 2 and described in French patent application no. 89 03861 in the name of the Applicant.

As represented in FIG. 2, the circuit 4B comprises essentially a static processing circuit 30 constituted of two identical vertical filtering circuits 13A, 13B which filter the odd frames and the even frames respectively, and an adder 14 receiving the outputs from the circuits 13A and 13B. More specifically, the circuit 13A is connected to the inputs A and B via a multiplexer 11A which functions at a frequency of 13.5 MHz. In the same way the circuit 13B is connected to the inputs C and D via a multiplexer 11B which functions at a frequency of 13.5 MHz. The filtering circuits filter at 108 MHz and their structure will be described in more detail below. The circuit 4B also includes a dynamic type signal processing circuit 21 connected to the inputs A, B, C and D via a multiplexer 12. The outputs 30 and 21 are connected to the input of a switching circuit 23 which switches to one or the other circuit as a function of a movement information signal DATV which comes either from the movement information contained in the pass-band reduction decoder, or from a movement detector 15 of known type which is connected to the inputs A, B, C and D of the circuit 7. The output of the detector 15 and the movement information MI are selected by a multiplexer 16 which switches to one or the other depending on a signal indicating the type of video signal to be processed, 625 or 1250. The output from the switching device 23 is input to a buffer circuit 19 which gives an output video signal S of the type 1250/2:1/100 Hz or 900/2:1/100 Hz.

We shall now describe, with reference to FIG. 5, a possible mode of embodiment for circuits 30 and 21. In this case, each vertical filtering circuit of the static type processing device 30 is constituted of two one-line delay cells 300 and 301 or 310 and 311, three multipliers or addition and delay cells 302, 303, 304 or 312, 313, 314 and two adders 305, 306 or 315, 316. The multipliers receive at one of their inputs a multiplication coefficient specific to each of them and sent under the action of a control signal C. These multiplication coefficients are a function of the sampling of the signal to be displayed. The multipliers receive at their other input either the direct output of the multiplexer 11A or 11B, or the output from the one-line delay cells 300, 301 or 310, 311. The outputs of the multipliers 302, 303, 304 or 312, 313, 314 are input to the adders 305, 306 or 315, 316 in such a way that the adder 305 or 315 receives the outputs from the multipliers 302, 303 or 312, 313 and the adder 306 or 316 receives the output from the adder 305, 315 and from the multiplier 304 or 314. The outputs of the two even or odd vertical filters are sent to an adder 32 which also cuts off the signal if necessary. The output of the adder 32 is sent to a one-line delay cell 33 to equalise the transit times within the static processing device 30 and the dynamic processing device 21.

As represented in FIG. 5, the dynamic processing device is also composed of a vertical filter with four identical one-line delay cells 211, 212, 213 and 214 mounted in series, each able to store one line of one frame. In addition, the vertical filter has five multipliers 215, 216, 217, 218, 219 which receive at one of their inputs a multiplication coefficient specific to the multiplier and inserted under the action of a control signal C. The multipliers 215, 216, 217, 218, 219 receive at their other input the output from the multiplexer 12, the output from the cell 211, the output from the cell 212, the output from the cell 213 and the output from the cell 214 respectively. In the same way, the outputs from the multipliers 215 to 219 are sent to adders 220, 221, 222, 223. The adder 220 receives the output from multipliers 215 and 216. The other adders 221, 222, 223 respectively receive the output of a multiplier 217, 218, 219 and the output of the preceding adder 220, 221, 222. The output from the adder 223 is sent to a cut-off device 224. In the vertical filter described above, the multipliers can be replaced by simple addition and delay cells.

We have described above a particular mode of embodiment of a device for conversion of frame frequency and number of lines for a high-definition television receiver able to receive input of high-definition video signals or standard 625/2:1/50 Hz signals or similar. It is clear to the informed person that the decoder described above depends on the algorithm used and that this decoder can be modified while remaining within the limits of the present invention, notably for the number of frame memories used or the processing circuits inside the decoder, the only constraints imposed being that they function at a frame frequency equal to the frame frequency desired at output, and that the even frames and the odd frames are obtained on two distinct channels in parallel at output from the decoder. The separation of each even and odd output into two channels is generally performed to limit the functioning frequency of the filters to 54 MHz, in the standard used.

What is claimed is:

1. Device for conversion of frame frequency and number of lines for a high-definition television receiver able to receive video input signals corresponding to different standards and give an output of a high-definition signal at desired frame frequency and with the desired number of lines, said device being associated with a pass-band reduction decoder processing input high-definition video signals, comprising:

at least a first memory to store the input video signal frames at a frequency which is a function of the frame frequency of the input signal, this memory being read at the frame frequency desired at output;

a pass-band reduction decoder connected to the memory and giving the even and odd frames of the decompressed high-definition video signal separately at outputs at the frame frequency desired at output, and a video processing circuit connected to the outputs of the pass-band reduction decoder able to deliver a display video signal at the required frame frequency and number of lines, said video processing circuit having:

a static signal processing circuit connected to the outputs of the pass-band reduction decoder giving the even and odd frames and delivering a signal at the required frame frequency and number of lines, a dynamic signal processing circuit connected alternately to the outputs of the pass-band reduction decoder giving the even and odd frames via a first switching circuit and delivering a signal at the required frame frequency and number of lines, and a second switching circuit connected respectively to the static signal processing device and to the dynamic signal processing device, the switching of the circuit being controlled by a movement detection signal (DATV).

2. Device according to claim 1, wherein the static signal processing circuit is constituted of two identical vertical filters connected to the outputs giving the even frames and the outputs giving the odd frames respectively, and whose outputs are connected to an adder.

3. Device according to claim 2, wherein the static signal processing circuit includes at least one one-line delay cell connected to the output of the adder in such a way as to deliver an output signal synchronous with the output signal from the dynamic signal processing circuit.

4. Device according to claim 1, wherein the dynamic signal processing circuit is constituted of a vertical filter enabling processing of the signals corresponding to the even and odd frames.

5. Device according to any one of claims 2 or 4, wherein each vertical filter is constituted by n delay cells giving a delay of one memory-line, $n+1$ multipliers each receiving at one input a specific multiplication coefficient which is a function of the number of lines to be displayed and at the other input, either the input of the first cell or the output of the n cells, a first adder adding the output of the first two multipliers and n adders adding the output of the preceding adder and that of the multiplier number $n+1$, n being a function of the number of frames to be processed simultaneously.

6. Device according to any one of claims 1, 2, 3 or 4, wherein the first memory has a capacity of $288$ lines $\times 720$ points $\times 8$ bits.

7. Device according to any one of claims 1, 2, 3 or 4, wherein the pass-band reduction decoder has at least m frame memories ($m \geq 3$) connected in series at the output of the first memory, a decoding circuit and four outputs generating respectively the even and odd frames for the even and odd points.

8. Device according to claim 7, characterised by the fact that it contains in addition four switching circuits each receiving at one input an output from the pass-band reduction decoder, and at the other input, either the input of the memories or the output of the first three memories, the said circuits switching to one or the other input depending on a signal indicating the type of video signals being input.

* * * * *